INVENTORS
HENRY G SCHOLER
BY JOHN V. MECHURA

ATTORNEY

United States Patent Office 3,306,602
Patented Feb. 28, 1967

3,306,602
WORK HOLDER FIXTURE
Henry Gardner Scholer, Carteret, and John V. Mechura, West Long Branch, N.J., assignors to The Bendix Corporation, Eatontown, N.J., a corporation of Delaware
Filed Aug. 11, 1964, Ser. No. 388,879
4 Claims. (Cl. 269—55)

The present invention relates to semiconductor devices and more particularly to a fixture for use in fabricating semiconductor devices.

Heretofore to reduce the amount of breakage incurred in the various processing of the silicon wafers it was necessary to process them individually, especially in the applications of the solderable ohmic contact. This severely limits production and obviously was expensive.

The present invention provides a fixture to hold silicon slices together. Further, the fixture is impervious to solvents, acids and temperatures up to 400° C. Using such a fixture, large quantities of slices may be processed per unit time. Also loading and unloading between operations is eliminated.

It is an object of the invention to provide a novel fixture for use in processing semiconductor devices.

Another object of the invention is to provide a novel fixturing technique for use in the fabrication of transistors.

Another object of the invention is to provide a means for economically fabricating semiconductor devices.

The above and other objects and features of the invention will appear more fully hereinafter from a consideration of the following description taken in connection with the accompanying drawing wherein one embodiment is illustrated by way of example.

Figure 1:
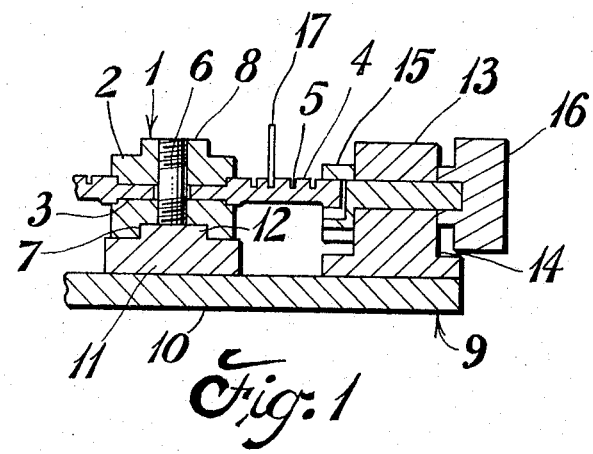
FIGURE 1 is a partial view of a holding fixture in position for loading.
Figure 2:
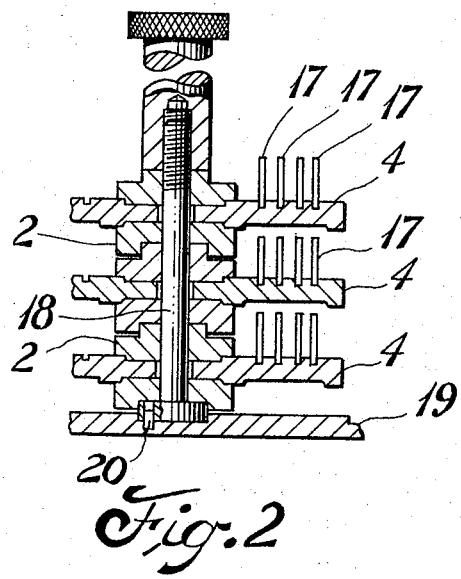
FIGURE 2 is a partial view of the loaded holding fixtures assembled for further processing.

Referring now to the drawing wherein similar parts in the various figures have been assigned the same reference numerals, a holding fixture is indicated generally by the numeral 1. The fixture 1 includes a hub 2 having a plurality of openings 3 therein adapted to receive arms 4. The arms 4 have a plurality of slots 5 therein. The hub 2 and arms 4 may be of Teflon or other similar material which is impervious to solvents, acids and will withstand temperature up to 400° C. The hub 2 has an axial opening 6 extending therethrough with a threaded section on each end thereof. Also the hub 2 has a recessed section 7 on one end and a raised section 8 on the other end thereof.

In order to load the slices of silicon in the slots 5 of the arms 4, the fixture 1 is placed on a holding fixture 9 which may be made out of stainless steel or other suitable material. The holding fixture 9 includes a base plate 10 upon which is mounted a locating block 11 which has a raised section 12 adapted to mate with the recessed section 7 of hub 2. Also mounted on the base plate 9 is a cam assembly 13. The cam assembly includes a mounting block 14, a cam and shaft 15 and a control or activating knob 16.

In operation, the fixture 1 is placed on the locating block 11 in which the recessed section 7 of the hub 2 is fitted on the raised section 12. The fixture 1 is rotated until one of the arms 4 is in alignment with the cam 15. Actuation of the cam 15 deflects the arm 4 sufficiently to open the slots 5 which permits the insertion of silicon 17 to be inserted therein. Then the cam 15 is released permitting the arm 4 to return to its normal position. Thus the slots produce a gentle compressive force on the wafers 17 holding them until they are released in the same manner. The fixture 1 is then rotated until another arm is aligned with the cam and the process repeated until all of the arms have had their slots filled.

After the holding fixture 1 has been loaded, it is placed on a stacking spindle 18 which is mounted on a plate 19 and secured thereto by a lock pin 20. After a predetermined number of tiers have been assembled on the spindle 8, three are shown for the purpose of illustration, a handle 21 is screwed over the spindle 18 compressing the tiers together to form one fixture.

With the silicon slices 17 loaded in the aforenoted fixture, a thin nickel plate in the order of 0.000025", is deposited by submerging the fixture in a heated electroless plating solution. Following a rinsing and drying sequence, the individual tiers 1 are removed. After removal the individual fixtures 1 are inverted, dipped in a flux and placed on a metal shaft (not shown) for drying. After drying, the fixtures are then exposed to a high temperature molten lead-tin solution wherein a thin lead-tin coating is deposited. The slices 17 while still in the fixtures 1, are cleaned, rinsed and dried. Next the fixtures 1 are then reassembled on the stacking spindle 18 and dipped in an etching solution for further cleaning. The fixtures 1 are then transferred back to the holding fixture 9 and unloaded by means of the cam action on the arms 4, thus permitting the removal of the wafers 17 from the slots 5 where the wafers are pressed on for further processing.

Although only one example of the invention has been illustrated and described, various changes in the form and relative arrangement of the parts, which will now appear to those skilled in the art, may be made without departing from the scope of the invention.

What is claimed is:

1. A holding fixture for processing semiconductor wafers comprising a hub; a plurality of arms fixed to and extending outward from said hub; each of said arms being formed of a resilient material and having a plurality of slots formed in a longitudinal surface thereof; means for holding said hub for rotation; and a cam member associated with said arms and adapted, on engagement therewith, to flex said arms in a direction whereby to open said slots to receive said wafers.

2. A fixture as set forth in claim 1 in which said hub and arms are of Teflon.

3. A fixture as in claim 1 wherein the cam member is positioned to coact with the ends of said arms to thereby effect said flexture and whereby said hub may be rotated to index said arms for sequential flexing and loading thereof.

4. A fixture as in claim 1 wherein the arm surfaces which are inclusive of said slots lie in a common horizontal plane.

References Cited by the Examiner
UNITED STATES PATENTS

| | | | |
|---|---|---|---|
| 1,150,256 | 8/1915 | Dunbar | 211—70 |
| 1,466,339 | 8/1923 | Plante | 95—100 |
| 1,804,913 | 5/1931 | Brunhoff | 211—20 |
| 1,991,137 | 2/1935 | Case et al. | |
| 2,429,173 | 10/1947 | Smith | 211—70 X |
| 2,522,416 | 9/1950 | Weiskopf | 118—503 |
| 2,817,313 | 12/1957 | Isreeli | 118—503 |
| 2,865,122 | 12/1958 | Clawson | 161—23 |
| 2,976,632 | 3/1961 | Phillips | 161—23 |
| 3,226,254 | 12/1965 | Reuschel | 18—503 |

FOREIGN PATENTS 73,187    4/1919    Austria.

MORRIS KAPLAN, *Primary Examiner.*